(12) United States Patent
Wolf

(10) Patent No.: US 6,563,088 B1
(45) Date of Patent: May 13, 2003

(54) PLUG CONNECTOR-SWITCH ASSEMBLY WITH BI-METALLIC UNIT

(75) Inventor: Roland Wolf, Hersbruck (DE)

(73) Assignee: Inter Control Hermann Kohler Elektrik GmbH & Co. KG, Nuremberg (DE)

(*) Notice: Subject to any disclaimer, the term of this patent is extended or adjusted under 35 U.S.C. 154(b) by 0 days.

(21) Appl. No.: 09/670,768

(22) Filed: Sep. 27, 2000

(30) Foreign Application Priority Data

Sep. 29, 1999 (DE) .......................... 199 46 627

(51) Int. Cl.⁷ .......................... H01R 13/66; B60N 3/14; B60R 16/02; F32Q 7/22; H01H 11/00
(52) U.S. Cl. .......................... 219/264; 219/265; 219/267; 337/103
(58) Field of Search .......................... 200/51 R–51.17; 337/6, 7, 103; 219/264, 265, 266, 267, 507–517

(56) References Cited

U.S. PATENT DOCUMENTS

| | | | | |
|---|---|---|---|---|
| 2,210,025 A | * | 8/1940 | Cohen ................. | 219/264 |
| 3,662,153 A | * | 5/1972 | Barnes et al. ......... | 219/265 |
| 3,863,047 A | * | 1/1975 | Mase ................... | 219/265 |
| 4,016,400 A | * | 4/1977 | Seibel et al. ......... | 219/264 |
| 5,796,073 A | * | 8/1998 | Mattis et al. ......... | 219/265 |
| 5,998,763 A | * | 12/1999 | Mattis et al. ........ | 219/265 |
| 6,051,814 A | * | 4/2000 | El-Haj ................ | 219/264 |

FOREIGN PATENT DOCUMENTS

| | | |
|---|---|---|
| DE | 39 32 602 C1 | 4/1990 |
| DE | 3932602 C1 * | 4/1990 |
| EP | 1088697 A2 * | 7/1992 |

* cited by examiner

Primary Examiner—J. R. Scott
(74) Attorney, Agent, or Firm—Merchant & Gould, P.C.

(57) ABSTRACT

An electrical plug-like connector, in particular a socket or cigar(ette) lighter in motor vehicles having a sleeve-like guide part for axially accepting a cigar(ette) lighter or a connector plug of an electrical device. A first fixed contact is arranged in the sleeve base region on an insulation carrier. The fixed first contact is acted upon by a counter contact, and the electrically conductive guide part forms a second fixed contact that acts upon other counter contacts. Thermal overload protection is also provided. Parallel to the thermal overload protection and at a distance from the insulation carrier, a sheet metal insert is provided, extending in the sleeve base section. On the underside of the sheet metal insert, an electrically-conductive bimetal-switch spring is fixed such that such that in the non-operative condition the bimetal switch spring acts upon the first fixed contact or upon a side contact connected with the side contact. The diameter of the sheet metal insert is less that the internal diameter of the sleeve-like guide part, such that the sheet metal insert can be introduced axially into the guide part from its opening side. In the final-assembly condition, the sheet metal insert is connected with a snap-catch connector to the insulation carrier, and is spaced such that an opening remains for the bimetal-switch spring to pivot in the energized condition.

15 Claims, 3 Drawing Sheets

PLUG CONNECTOR-SWITCH ASSEMBLY WITH BI-METALLIC UNIT

CROSS-REFERENCE TO RELATED APPLICATIONS

Not Applicable

STATEMENT REGARDING FEDERALLY FUNDED RESEARCH OR DEVELOPMENT

Not Applicable

INCORPORATION-BY-REFERENCE OF MATERIAL SUBMITTED ON A COMPACT DISC

Not Applicable

REFERENCE TO A "MICROFICHE APPENDIX"

Not Applicable

BACKGROUND OF THE INVENTION (1) Field of the Invention

The invention concerns an electrical plug-type connector, in particular a socket or a cigar(ette) lighting device for motor vehicles.

(2) Description of Related Art

One electrical plug-type connector of the aforementioned type, for example that known from German Patent 3932602C1, comprises a sleeve-like guide part for the axially displaceable acceptance of a cigar(ette) lighter or a connection plug of an electrical device. A first contact is arranged in the sleeve base section on an insulation carrier to be acted upon by a counter contact. The electrically-conductive guide part forms a second fixed contact that acts upon other counter contacts. Thermal overload protection is also provided on the known electrical plug-type connector.

A known electrical plug-type device is indeed functional in that it provides thermal protection. However, the known device is disadvantageous to produce, since the PTC resistor must be riveted with other parts, and rapid response to current overload is not guaranteed when the conventional plug-type connector is used as a socket.

BRIEF SUMMARY OF THE INVENTION

The object of the invention is to improve an electrical plug-type connector of the aforementioned type such that it requires only few parts for the thermal protection function, so that it can be assembled in simple fashion with common parts, thereby assuring a high degree of functionality and robustness against inappropriate manipulation of the device, and so that the protection device responds rapidly and positively to a current overload of more than, for example, 15 A.

This objective is satisfied as follows.

An exemplary embodiment of an electrical plug-type connector, in particular a socket or a cigar(ette)-lighting device in motor vehicles, includes a sleeve-like guide part (1). The guide part (1) axially accepts a cigar(ette) lighter or a connector plug of an electrical device. A fixed contact (5) is arranged on an insulation carrier (4) in the base section of the guide part (1). The at least sectionally electrically-conducting guide part (1) forms a second fixed contact that acts upon other counter contacts. Overload protection (6) is also provided.

In accordance with the invention, a sheet metal insert is provided parallel to the overload protector and at a distance from the insulation carrier, and extending inside the base region of the sleeve. An electrically-conductive bimetal-switch spring is fixed to the underside of the sheet metal insert. In the non-operative condition, the bimetal-switch spring acts upon the first fixed contact or upon a side contact (10) connected with the side contact (10). Here, the diameter of the sheet metal insert is less that the internal diameter of the sleeve-like guide part, whereby the sheet metal insert can be introduced axially from the opening side into the guide part. In the final-assembly condition, the sheet metal insert is connected by a snap/catch connector with the insulation carrier spaced such that a pivot-region opening is provided for the bimetal-switch spring in the energized condition.

The invention provides a cohesive functional subassembly that can be pre-assembled, and that can also be pre-tested, in particular its electrical and thermal protection properties. The pre-assembled functional subassembly, consisting of sheet metal insert, bimetal-switch spring and possibly a bimetal spring, which locks a cigar(ette) lighter during the heat-up phase and thermally releases after the heat-up phase, can be snapped onto the pre-assembled basic subassembly, consisting of the insulation carrier and the center contact and/or a side contact, with only a single motion. Compared to known devices, an electrical plug device in accordance with the principles of the claimed invention responds more quickly. It is also easy to assemble, requires little space and can be pre-tested for its thermal properties.

In order to further simplify the mutual mounting of the two subassemblies, the insulation carrier is provided on the edge side with position-limiting projections extending axially over the base section. These projections also define the distance of the sheet metal insert from the base section of the insulation carrier. In the final mounting condition, the sheet metal insert, with L-shaped upward bends in the edge thereof, overlaps the position-limiting projections, whereby the two parts may be locked together by snap/catch connector to achieve a stable mechanical hold. The L-legs of the L-shaped upward bends of the edge here lie on the position-limiting projections.

A particularly advantageous snap/catch connector may be used, so as to provide durable four-point attachment of the pre-assembled functional subassembly to the basic subassembly, and to protect the attachment from manipulation.

In such an embodiment, the sheet metal insert (7) may be provided with springy detents (16) that engage into catch openings (17) of the insulation carrier (4). The detents (16) may be arranged in cutouts (15) of the L-shaped edge upward bends (13). In addition, the cutouts (15) of the L-shaped edge upward bends (13) may penetrate through the flat area of the sheet metal insert (7) as well as both L-legs (14).

The bimetal-switch spring is connected in off-center fashion with the underside of the sheet metal insert, whereby a longer switch travel as well as a relatively great bimetal-switch spring length are made possible. The switch travel is further increased by arranging the side contact in a recess of the insulation carrier. Additionally, pre-fixing for the rivet-mounting process is made possible through a recess in the insulation carrier, enabling insertion of the side contact.

Defined anchoring and supporting of the bimetal spring on the insert is enabled by a plate-like bulge of the sheet metal insert in its center area.

The steps for producing and mounting electrical plug-type connector as described herein are as follows.

An at least sectionally electrically conductive sleeve-like guide part, adapted for axially accepting a cigar(ette) lighter or a connector plug of an electrical device, is provided.

An insulation carrier is provided, and a contact support is mounted with a side contact through a central rivet on the base section of the insulation carrier.

The insulation carrier is mounted in the base region of the sleeve-like guide part.

A sheet metal insert is provided, the outer diameter of the sheet metal insert being less than the internal diameter of the sleeve-like guide part.

A bimetal-switch spring is electrically attached to the underside of the sheet metal insert. An approximately U-shaped sheet metal insert is also attached with the U-middle section on the sheet metal insert, in such manner that the U-side sections extend out over the sheet metal insert.

The functional unit forming a thermal overload protector, consisting of the sheet metal insert, bimetal switch spring and bimetal spring, is thermally pre-tested. If required, it may also be calibrated.

The functional unit is inserted into the sleeve part in the plug-in direction.

A snap/catch connector is produced between the sheet metal insert and the insulation carrier in such manner that the bimetal-switch spring acts upon the side contact with one contact element, when in the non-actuated condition.

BRIEF DESCRIPTION OF THE SEVERAL VIEWS OF THE DRAWINGS

The invention is explained in more detail with the aid of an exemplary embodiment in the drawings.

These show.

DETAILED DESCRIPTION OF THE INVENTION

Figure 1:
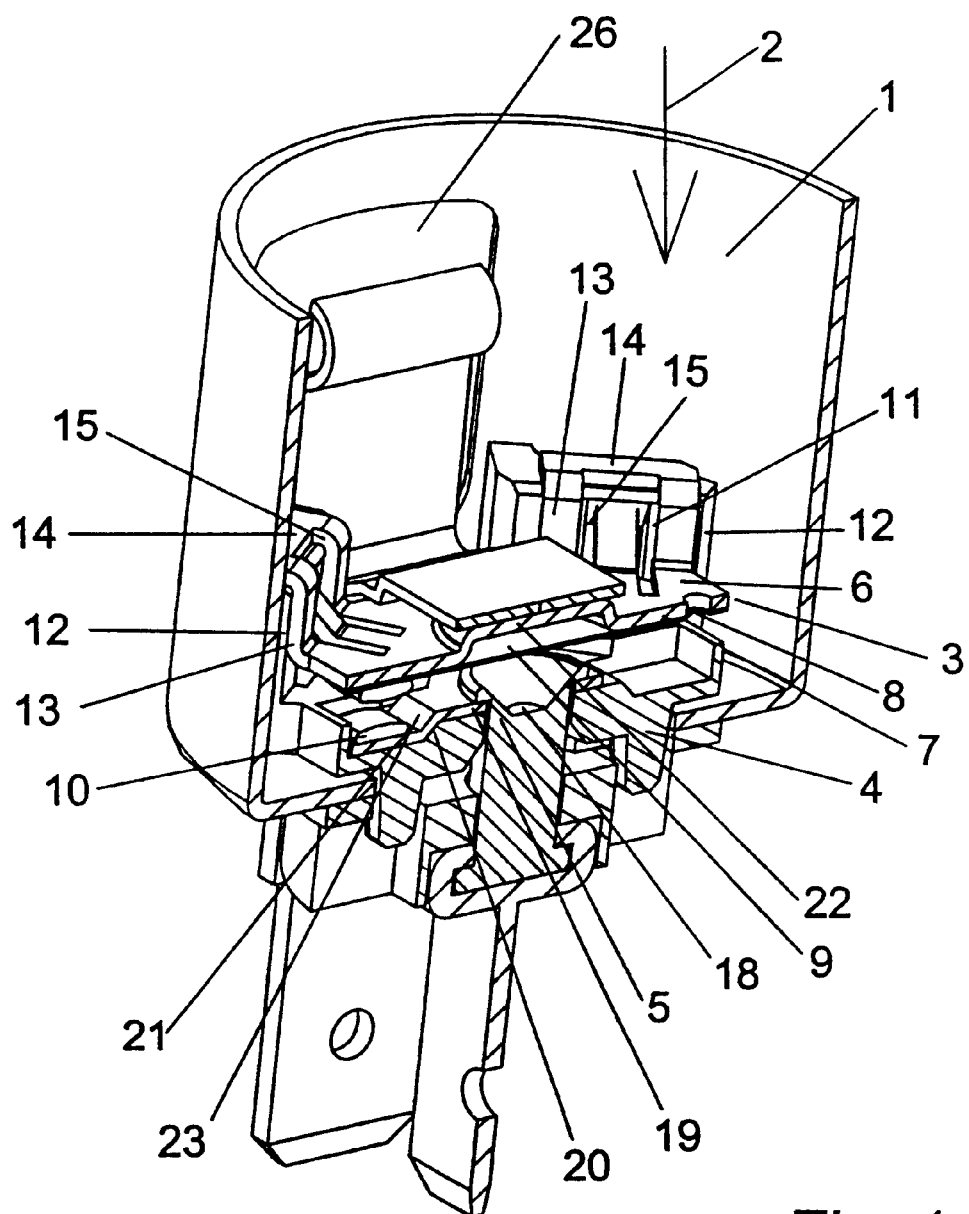
FIG. 1. a perspective, center-section view of the functional subassembly and the base subassembly joined with one another.

The electrical plug-type connector comprises a sleeve-like guide part 1, into which can be pushed in the axial direction 2 either a cigar(ette) lighter or a connector plug of an electrical device. Arranged in the base section 3 of the guide part 1 on an insulation carrier 4 is a first fixed contact 5; the electrically conductive guide part 1 forms a second fixed contact that cooperates with counter contacts or housing parts of the cigar(ette) lighter or connector plug. Thermal overload protection 6 is also provided in the sleeve base region 3.

Figure 2:
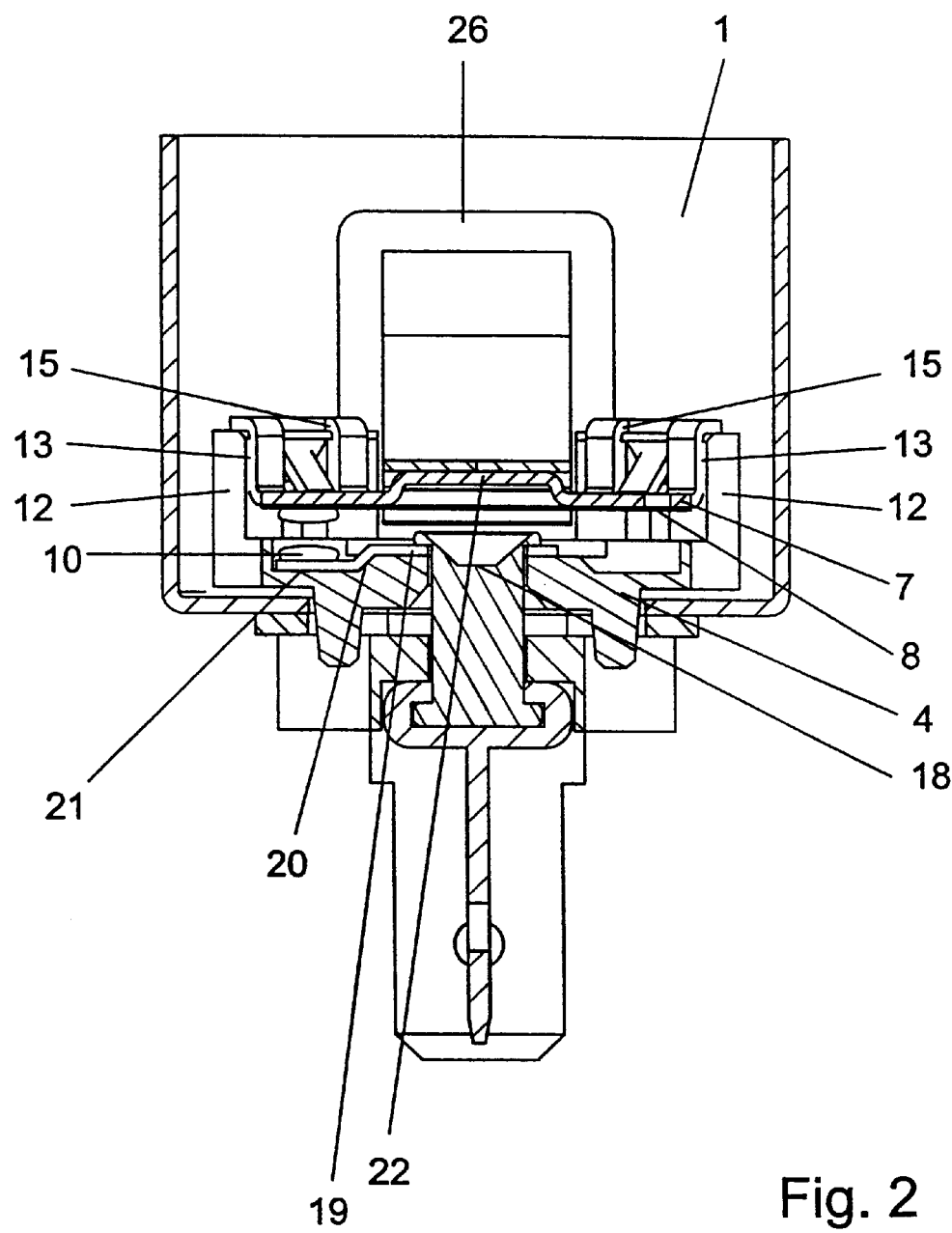
FIG. 2. a section through the two subassemblies.
Figure 3:
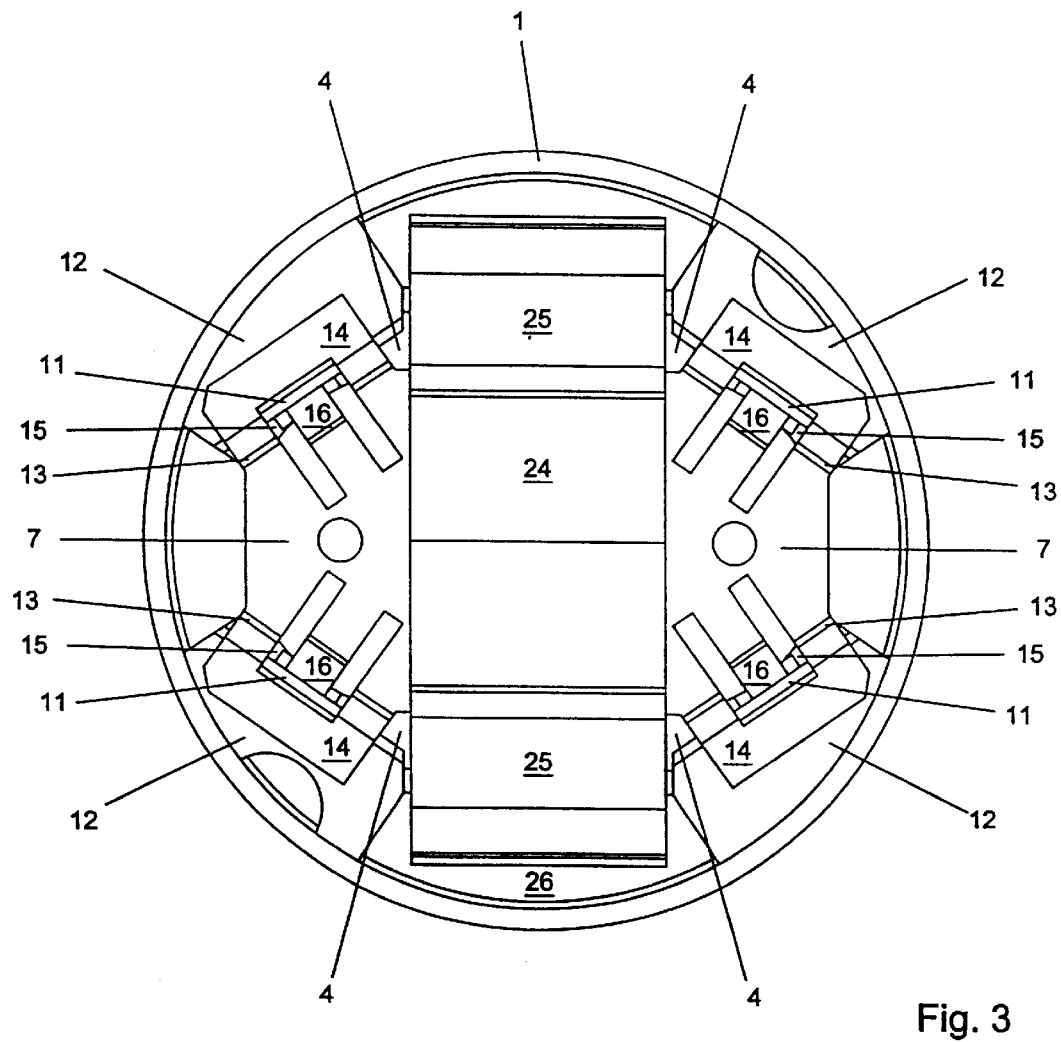
FIG. 3. a top view in the insertion direction of the two joined subassemblies of the electrical plug-type connector.

Parallel to the thermal overload protection 6 and spaced from the insulation carrier 4 is a sheet metal insert 7 extending in the base section 3. On the underside 8 of the sheet metal insert 7, a bimetal-switch spring 9 is attached in an electrically conducting fashion. In the non-operative condition, the bimetal-switch spring 9 acts upon a side contact 10 connected with the first fixed contact 5. In FIGS. 1 and 2, the bimetal-switch spring 9 is represented in the so-called energized or operative condition, in which the contact path between movable contact and side contact 10 is open. In the non-operative condition, which is not shown, the bimetal-switch spring 9 in FIGS. 1 and 2 is bent slightly downward so that the mutually opposed contacts meet.

The diameter of the sheet metal insert 7 is less than the internal diameter of the sleeve-like guide part 1, so that the sheet metal insert can be pushed in the axial direction 2 into the guide part 1 from the opening side of the guide part. In the final mounting condition as shown, the sheet metal insert 7 is joined through a multiple snap/catch connector 11 with the insulation carrier 4, with a spacing such that in the energized condition an opening providing space for the bimetal-switch spring 9 to pivot remains.

The insulation carrier 4 is provided on its edge with location-limiting projections 12 extending axially over the base section 3; the sheet metal insert 7 has corresponding L-shaped upward bends 13 at the edge thereof. In the final mounting condition, the L-legs 14 lies against the top side of the location-limiting projections 12 and thereby define the axial spacing of the sheet metal insert from the insulation carrier 4.

The L-shaped upward bends 13 are provided with cutouts 15. In the cutouts 15 are cleanly cut springy detents 16 that engage into catch openings 17 of the insulation carrier 4. The cutouts 15 of the L-shaped upward bends 13 of the edge penetrate the surfaces of the sheet metal insert 7 as well also both L-legs 14.

The fixed contact 5 in the center of the insulation carrier 4 is formed by a fastening rivet that penetrates the base of the insulation carrier 4 and changes over into a flat plug 18. The rivet or, to be precise, the rivet head overlaps a support element 19 of the side contact 10 that is provided with a downward bend 20, such that the side contact 10 comes to rest in a recess 21.

The center section of the sheet metal insert 7 is provided with a plate-like bulge 22. A somewhat U-shaped bent bimetal spring 24 is attached to the bulge at the mid-section of the U. Upon heating, the bimetal spring 24 opens both of its U-legs 25, and thereby releases a pushed-in cigar(ette) lighter into a removal position. The U-legs 25 of the bimetal spring 24 extend between the position-limiting projections 12 of the insulation carrier and penetrate side recesses 26 of the sleeve-like guide part 1.

I claim:

1. Electrical plug-type connector, in particular a socket or a cigar(ette)-lighting device in motor vehicles or the like, comprising a sleeve-like guide part (1) for the axially displaceable acceptance of a cigar(ette) lighter or of a connector plug of an electrical device, with a fixed contact (5) being arranged on an insulation carrier (4) in the base section of the guide part (1), and the at least sectionally electrically-conducting guide part (1) forming a second fixed contact that acts upon other counter contacts, and there further being provided an overload protection (6), characterized by the following features a) the thermal and electrical overload protection (6) displays, parallel to it and at a distance from the insulation carrier (4), a sheet metal insert (7) extending in the base section (3) on whose underside (8) is fixed an electrically-conductive bimetal-switch spring (9), which in the non-operative condition acts upon the first fixed contact (5) or upon a side contact (10) connected with this latter;

b) the diameter of the sheet metal insert (7) is less than the internal diameter of the sleeve-like guide part (1);

c) the sheet metal insert (7) can be introduced axially from the opening side into the guide part (1);

d) in the final-assembly condition, the sheet metal insert (7) is connected, in particular with a snap/catch connector (11), with the insulation carrier (4) spaced such that there remains a pivot-region opening for the bimetal-switch spring (9) in the energized condition.

2. Electrical plug-type connector according to claim 1, characterized by the fact that the insulation carrier (4) is provided on the edge side with position-limiting projections (12) extending axially over the base section (3).

3. Electrical plug-type connector according to claim 2, characterized by the fact that the sheet metal insert (7) is provided with L-shaped edge upward bends (13) with the L-leg (14), in the final-assembly condition, lying against the position-limiting projections (12).

4. Electrical plug-type connector according to one of the foregoing claims, characterized by the fact that the sheet metal insert (7) is provided with springy detents (16) that engage into catch openings (17) of the insulation carrier (4).

5. Electrical plug-type connector according to one of the foregoing claims, characterized by the fact that the detents (16) are arranged in cutouts (15) of the L-shaped edge upward bends (13).

6. Electrical plug-type connector according to claim 5, characterized by the fact that the cutouts (15) of the L-shaped edge upward bends (13) penetrate through the flat area of the sheet metal insert (7) as well as both L-legs (14).

7. Electrical plug-type connector according to one of the foregoing claims, characterized by the fact that the bimetal-switch spring (9) is connected with the underside (8) of the sheet metal insert (7) in off-center fashion.

8. Electrical plug-type connector according to one of the preceding claims, characterized by the fact that arranged in the center of the insulation carrier (4) is a fastening rivet that goes through the base of the insulation carrier (4), changes over into a flat contact (18), and with its rivet head overlaps a support element (19) of the side contact (10).

9. Electrical plug-type connector according to one of the foregoing claims, characterized by the fact that the support element (19) for the side contact (10) is provided with a downward bend (20) and the side contact (10) lies in a recess (21) of the insulation carrier (4).

10. Electrical plug-type connector according to one of the foregoing claims, characterized by the fact that the central area of the sheet metal insert (7) is provided with a plate-like bulge (22).

11. Electrical plug-type connector according to claim 10, characterized by the fact that attached on the plate-like bulge (22) of the sheet metal insert (7) of the U-center region (23) is a somewhat U-shaped bent bimetal spring (24).

12. Electrical plug-type connector according to claim 11, characterized by the fact that the U-legs (25) of the bimetal spring (24) extend between the position-limiting projections (12) of the insulation carrier (4).

13. Electrical plug-type connector according to claim 1, wherein the sheet metal insert is connected with the insulation carrier with a snap/catch connector.

14. Electrical plug-type connector according to claim 11, wherein the sheet metal insert comprises L-shaped edge upward bends;

the L-shaped upward bends define cut-outs; and the U-legs of the bimetal spring penetrate through the cutouts.

15. Procedure for production of an electrical plug-type connector, in particular a socket or a cigar(ette) lighting device for motor vehicles and the like, characterized by the following procedural steps provision of an at least sectionally electrically conductive, sleeve-like guide part for the axially displaceable acceptance of a cigar(ette) lighter or of a connector plug of an electrical device;

provision of an insulation carrier and mounting of a contact support with a side contact through a central rivet on the base section of the insulation carrier;

mounting of the insulation carrier in the base region of the sleeve-like guide part;

provision of a sheet metal insert whose outer diameter is less than the internal diameter of the sleeve-like guide part;

electrically conducting attachment of a bimetal-switch spring on the underside of the sheet metal insert, as well as attachment of an approximately U-shaped sheet metal insert with the U-middle section on the sheet metal insert in such manner that the U-side sections extend out over the sheet metal insert, thermal pre-testing and, if required, calibration of the functional unit forming a thermal overload protection consisting of sheet metal insert, bimetal switch spring and bimetal spring;

insertion of the functional unit in the plug-in direction into the sleeve part;

production of a snap/catch connector between the sheet metal insert and the insulation carrier in such manner that the non-actuated bimetal-switch spring acts upon the side contact with one contact element.

* * * * *